United States Patent
Li et al.

(10) Patent No.: US 12,385,363 B2
(45) Date of Patent: Aug. 12, 2025

(54) NITROGEN-CARBON DIOXIDE MIXED GAS JETTING APPARATUS FOR HORIZONTAL WELL AND EXPLOITATION METHOD

(71) Applicant: GUANGZHOU INSTITUTE OF ENERGY CONVERSION, CHINESE ACADEMY OF SCIENCES, Guangzhou (CN)

(72) Inventors: Dongliang Li, Guangzhou (CN); Xiang Li, Guangzhou (CN); Fuqin Lu, Guangzhou (CN); Deqing Liang, Guangzhou (CN); Xuebing Zhou, Guangzhou (CN); Jingsheng Lu, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 18/578,322

(22) PCT Filed: Oct. 27, 2022

(86) PCT No.: PCT/CN2022/127832
§ 371 (c)(1),
(2) Date: Jan. 11, 2024

(87) PCT Pub. No.: WO2023/041090
PCT Pub. Date: Mar. 23, 2023

(65) Prior Publication Data
US 2024/0301273 A1    Sep. 12, 2024

(30) Foreign Application Priority Data
Dec. 28, 2021 (CN) .......................... 202111625574.4

(51) Int. Cl.
*C09K 8/52* (2006.01)
*C09K 8/70* (2006.01)
(Continued)

(52) U.S. Cl.
CPC ............ *E21B 41/0099* (2020.05); *C09K 8/52* (2013.01); *C09K 8/70* (2013.01); *C10L 3/108* (2013.01);
(Continued)

(58) Field of Classification Search
CPC ...... E21B 41/009; E21B 43/164; E21B 43/20; E21B 43/01; E21B 43/26; E21B 43/30;
(Continued)

(56) References Cited

U.S. PATENT DOCUMENTS 1,111,784 A * 9/1914 Blackburn .............. F16G 11/12
254/242
7,222,673 B2 * 5/2007 Graue ...................... C09K 8/52
166/305.1
(Continued)

FOREIGN PATENT DOCUMENTS

| CN | 103216219 A | 7/2013 |
| CN | 105971581 A | 9/2016 |

(Continued)

*Primary Examiner* — Nicole Coy
*Assistant Examiner* — Douglas S Wood
(74) *Attorney, Agent, or Firm* — Bayramoglu Law Offices LLC

(57) ABSTRACT

A nitrogen-carbon dioxide mixed gas jet apparatus for a horizontal well and an exploitation method is presented. The jet apparatus includes: an offshore platform, a natural gas processing unit, and a pressurizing unit, wherein a portion of the gas exploitation pipe in the hydrate layer is provided with a gas injection horizontal well; a mixed gas jet unit and a nozzle assembly are disposed in the gas injection horizontal well; the mixed gas jet unit is configured to mix nitrogen (Continued)

and carbon dioxide, and then inject the mixed gas into a hydrate deposition layer through the nozzle assembly, so that the mixed gas replaces methane gas in the hydrate deposition layer; the portion of the gas exploitation pipe in the hydrate layer is provided with a gas exploitation horizontal well configured to collect the methane gas and convey the methane gas to the natural gas processing unit.

6 Claims, 3 Drawing Sheets

(51) Int. Cl.
  *C10L 3/10* (2006.01)
  *E21B 41/00* (2006.01)
  *E21B 43/16* (2006.01)
(52) U.S. Cl.
  CPC ........ *E21B 43/164* (2013.01); *C09K 2208/22* (2013.01)
(58) Field of Classification Search
  CPC . E21B 7/06; E21B 43/22; E21B 43/16; E21B 43/243; E21B 43/24; F28F 13/00; F24H 1/52; C09K 8/52; C09K 8/70; C10L 3/108
  USPC .......................................................... 166/319
  See application file for complete search history.

(56) References Cited

U.S. PATENT DOCUMENTS

| | | | |
|---|---|---|---|
| 10,982,490 B2* | 4/2021 | Hahn | E21B 7/046 |
| 11,111,784 B2* | 9/2021 | Willberg | E21B 43/12 |
| 11,326,434 B2* | 5/2022 | Nguyen | C09K 8/64 |
| 11,634,978 B2* | 4/2023 | Goldsmith | E21B 43/283 299/4 |
| 2009/0032248 A1* | 2/2009 | Svoboda | C10L 3/108 166/279 |
| 2012/0292026 A1* | 11/2012 | Brooks | E21B 43/20 166/270.1 |
| 2014/0367097 A1* | 12/2014 | Milam | E21B 43/2408 166/57 |
| 2015/0129230 A1* | 5/2015 | Carlson | E21B 43/263 166/308.1 |
| 2016/0230526 A1* | 8/2016 | Crews | E21B 43/26 |
| 2020/0087913 A1* | 3/2020 | Dash | E04B 2/789 |
| 2020/0308944 A1* | 10/2020 | Castrogiovanni | E21B 43/164 |
| 2021/0087913 A1* | 3/2021 | Okatsu | E21B 41/0099 |

FOREIGN PATENT DOCUMENTS

| | | |
|---|---|---|
| CN | 106761607 A | 5/2017 |
| CN | 108868736 A | 11/2018 |
| CN | 109736752 A | 5/2019 |
| CN | 110159232 A | 8/2019 |
| CN | 209687475 U | 11/2019 |
| CN | 112431581 A | 3/2021 |
| CN | 113294126 A | 8/2021 |
| CN | 114320249 A | 4/2022 |

* cited by examiner

NITROGEN-CARBON DIOXIDE MIXED GAS JETTING APPARATUS FOR HORIZONTAL WELL AND EXPLOITATION METHOD

CROSS REFERENCE TO THE RELATED APPLICATIONS

This application is the national phase entry of International Application No. PCT/CN2022/127832, filed on Oct. 27, 2022, which is based upon and claims priority to Chinese Patent Application No. 202111625574.4, filed on Dec. 28, 2021, the entire contents of which are incorporated herein by reference.

TECHNICAL FIELD

The present invention relates to the technical field of energy exploitation, and specifically to a nitrogen-carbon dioxide mixed gas jet apparatus for a horizontal well and an exploitation method.

BACKGROUND

A natural gas hydrate is a crystalline substance formed from natural gas and water under a low temperature and a high pressure, looks like ice, is combustible and commonly known as "combustible ice", and widely exists in permafrost and seabeds. It is estimated that the carbon content of the natural gas hydrate in the natural world is twice the total carbon content of other fossil energy sources, thereby being a potential energy resource.

Most of existing natural gas hydrate exploitation technologies are in laboratory research stages, and only a few of them have been applied to trial exploitation of hydrates, such as the fluid extraction method of the China Geological Survey and the solid natural gas hydrate fluidization trial exploitation scheme of the China National Offshore Oil Corporation. Among these trial exploitation schemes, except for a near-wellbore reservoir reformation method that is used in a natural gas hydrate trial exploitation process in China in 2017 to further improve permeability of a reservoir and increase the exploitation capacity, reservoir reformation is carried out in none of existing international field exploitation experiments. As a result, a single-well gas production rate and a gas production cycle that are acquired after trial exploitation are far from ideal, and cannot meet the requirements of commercial exploitation at all.

SUMMARY

With respect to the deficiencies of the prior art, the present invention provides a nitrogen-carbon dioxide mixed gas jet apparatus for a horizontal well and an exploitation method. Mixed gas that is of nitrogen and carbon dioxide and in a jet state impacts a hydrate deposition layer, so that the hydrate deposition layer under a gas injection horizontal well is fractured to form a crack, and carbon dioxide replaces methane gas at the same time. Therefore, hydrate exploitation is realized.

To achieve the above objective, the present invention may adopt the following technical solutions.

A nitrogen-carbon dioxide mixed gas jet apparatus for a horizontal well is provided. The jet apparatus is used in a hydrate exploitation process and includes:

an offshore platform;

a natural gas processing unit disposed on the offshore platform and extending deep into a hydrate layer of a natural gas reservoir through a gas exploitation pipe; and a pressurizing unit disposed on the offshore platform and extending deep into the hydrate layer of the natural gas reservoir through a gas injection pipe, wherein a portion of the gas exploitation pipe in the hydrate layer is provided with a gas injection horizontal well; a mixed gas jet unit and a nozzle assembly are disposed in the gas injection horizontal well; the mixed gas jet unit is configured to mix nitrogen and carbon dioxide, and then inject the mixed gas into a hydrate deposition layer of the hydrate layer through the nozzle assembly in a dispersed manner, so that the mixed gas of nitrogen and carbon dioxide replaces methane gas in the hydrate deposition layer; the portion of the gas exploitation pipe in the hydrate layer is provided with a gas exploitation horizontal well; and the gas exploitation horizontal well is configured to collect the methane gas and convey the methane gas to the natural gas processing unit.

According to the nitrogen-carbon dioxide mixed gas jet apparatus for a horizontal well, further, the mixed gas jet unit includes several cylindrical parts connected in series.

According to the nitrogen-carbon dioxide mixed gas jet apparatus for a horizontal well, further, each of the cylindrical parts includes a high-pressure water-proof chamber and a high-pressure gas injection chamber, wherein the high-pressure gas injection chamber is used as a gas passage of the mixed gas of nitrogen and carbon dioxide; and the high-pressure water-proof chamber is used to isolate the high-pressure gas injection chamber from the outside world.

According to the nitrogen-carbon dioxide mixed gas jet apparatus for a horizontal well, further, two adjacent high-pressure water-proof chambers are movably connected to each other through a hinge; and two adjacent high-pressure gas injection chambers are connected to each other through a flexible connector.

According to the nitrogen-carbon dioxide mixed gas jet apparatus for a horizontal well, further, each of the cylindrical parts is provided with at least one nozzle assembly; the nozzle assembly includes a solenoid valve and a nozzle, wherein the nozzle is configured to inject the mixed gas of nitrogen and carbon dioxide into the hydrate deposition layer of the hydrate layer; and the solenoid valve is configured to control opening and closing of the nozzle.

According to the nitrogen-carbon dioxide mixed gas jet apparatus for a horizontal well, further, each of the cylindrical parts is provided with cable interfaces and auxiliary guide wheels, wherein the cable interfaces include a strong-current cable interface and a weak-current cable interface; a strong-current cable is electrically connected to the auxiliary guide wheels to control a main body apparatus to move leftwards or rightwards; and a weak-current cable is electrically connected to the solenoid valve to control the start and stop of the solenoid valve.

According to the nitrogen-carbon dioxide mixed gas jet apparatus for a horizontal well, further, both the gas injection horizontal well and the gas exploitation horizontal well are disposed horizontally; and a gas injection opening of the gas injection horizontal well faces a gas exploitation opening of the gas exploitation horizontal well.

According to the nitrogen-carbon dioxide mixed gas jet apparatus for a horizontal well, further, the hinge is made of a pressure-resistant and corrosion-resistant material; and the flexible connector is a high-pressure-resistant and corrosion-resistant hose whose left and right ends are provided with pipe joints having internal threads, and is configured to connect the high-pressure gas injection chamber.

A method of using mixed gas of nitrogen and carbon dioxide to exploit a hydrate is provided. The method uses the apparatus described above and includes:

using the pressurizing unit to pressurize the mixed gas of nitrogen and carbon dioxide to a pressure higher than a set pressure value, and sending the pressurized gas to the gas injection horizontal well through the gas injection pipe, wherein the mixed gas jet unit of the gas injection horizontal well mixes nitrogen and carbon dioxide, and then sprays the mixed gas of nitrogen and carbon dioxide in a jet state through the nozzle assembly in a dispersed manner;

the mixed gas that is of nitrogen and carbon dioxide and in the jet state impacts the hydrate deposition layer, so that the hydrate deposition layer under the gas injection horizontal well is fractured to form a crack, and carbon dioxide replaces methane gas at the same time; and with progress of a gas injection process, methane gas around a pipe of the gas injection horizontal well is also replaced, and outward extension of the crack leads to an increase of permeability around the gas injection horizontal well, so that a dissociation area of the hydrate deposition layer is enlarged; and the methane gas is conveyed to the natural gas processing unit through the gas exploitation horizontal well.

According to the method of using mixed gas of nitrogen and carbon dioxide to exploit a hydrate, further, with the progress of the gas injection process, after the nozzle through which gas is injected is closed by using the solenoid valve, the auxiliary guide wheels are used to control the mixed gas jet unit to move leftwards or rightwards, so that a position at which the mixed gas is injected is changed.

Compared with the prior art, the present invention has the following beneficial effects:

(1) According to the present invention, gap jet of mixed gas can be realized; a gas replacing passage is prevented from being blocked; and efficiency of replacing methane with carbon dioxide is improved.

(2) According to the present invention, an injected medium can be replaced; heat injection and chemical agent injection are performed to exploit a natural gas hydrate; and the practicability is high.

BRIEF DESCRIPTION OF THE DRAWINGS

To describe the technical schemes in the embodiments of the present invention more clearly, the following briefly describes the accompanying drawings required in the embodiments. Apparently, the accompanying drawings in the following description show merely some embodiments of this application, and a person of ordinary skills in the art may still derive other drawings from these accompanying drawings without creative efforts.

Figure 1:
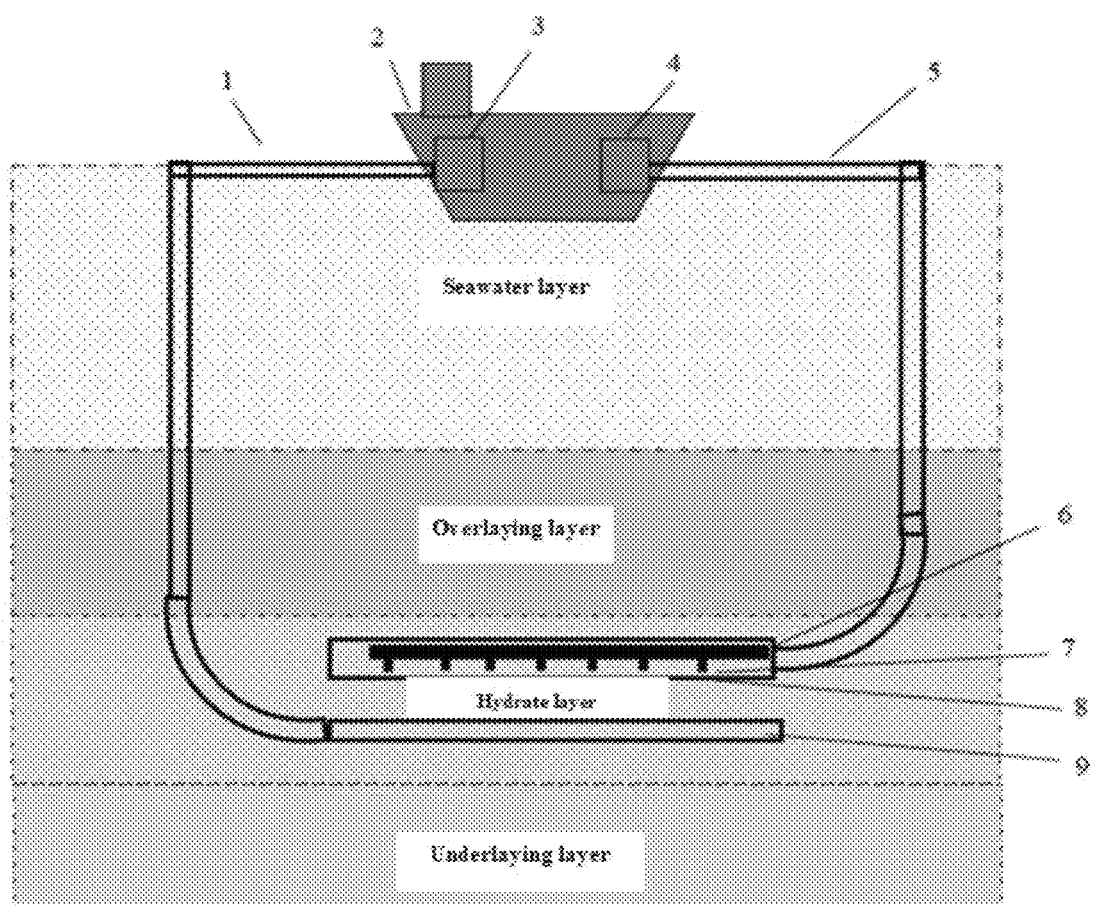
FIG. 1 is a schematic structural diagram of a nitrogen-carbon dioxide mixed gas jet apparatus for a horizontal well according to an embodiment of the present invention.

Reference numerals in the accompanying drawings are as follows: 1: gas exploitation pipe; 2: offshore platform; 3: natural gas processing unit; 4: pressurizing unit; 5: gas injection pipe; 6: mixed gas jet unit; 7: nozzle assembly; 8: gas injection horizontal well; 9: gas exploitation horizontal well; 10: auxiliary guide wheel; 11: strong-current cable interface; 12: high-pressure water-proof chamber; 13: high-pressure gas injection chamber; 14: weak-current cable interface; 15: flexible connector; 16: solenoid valve; 17: nozzle; 18: hinge.

DETAILED DESCRIPTION OF THE EMBODIMENTS

The following clearly and completely describes technical solutions in embodiments of the present invention with reference to the accompanying drawings in the embodiments of the present invention. Apparently, the described embodiments are some but not all of the embodiments of this application. All other embodiments acquired by a person of ordinary skill in the art based on embodiments of this application without creative efforts shall fall within the protection scope of this application.

EMBODIMENTS

It is to be noted that terms "first", "second", and the like used in the description, the claims, and the accompanying drawings are used for the purpose of distinguishing similar objects instead of indicating a particular order or sequence. It should be understood that the data used in this way can be interchanged under appropriate circumstances, so that the embodiments of the present invention described herein can be implemented in an order other than the order illustrated or described herein. In addition, the terms "include" and "have" and any variations thereof in the embodiments of the present invention are intended to cover the inclusion in a non-exclusive manner. For example, the process, method, system, product, or device that includes a series of steps or units need not to be limited to those steps or units as clearly listed, but may include other steps or units not clearly listed or inherent to the process, method, product, or device.

It should be understood that the orientation or position relationships indicated by terms "central", "longitudinal", "transverse", "length", "width", "thickness", "upper", "lower", "front", "back", "left". "right", "vertical", "horizontal", "top", "bottom", "inner", "outer", "clockwise", "counterclockwise", "axial", "radial", "circumferential", and the like are orientation or position relationships shown in the accompanying drawings, and are merely intended to facilitate the description of the present invention and simplify the description, rather than to indicate or imply that the mentioned apparatus or elements must have a specific orientation or be constructed and operated in a specific orientation. Therefore, these terms may not be construed as a limitation to the present invention.

In description of the present invention, "a plurality of" means at least two, for example, two or three, unless otherwise clearly and specifically limited. In addition, unless otherwise clearly specified and limited, terms such as "mounted", "connected with", and "connected to" should be understood in a broad sense. For example, a connection may be a fixed connection, a detachable connection, or an integrated connection, may be a mechanical connection or an electrical connection, may be a direct connection or an indirect connection via an intermediate medium, or may be an internal connection between two components. For a person of ordinary skill in the art, specific meanings of the above terms in the present invention may be understood based on specific situations.

In the present invention, unless expressly specified and defined otherwise, a first feature being "above" or "below" a second feature may include direct contact between the first and second features or indirect contact between the first and second features through an inter-medium. Moreover, the first feature being "on", "above", or "over" the second feature may be the first feature being directly above or obliquely above the second feature, or simply means that the level of the first feature is higher than the level of the second feature. The first feature being "beneath", "below", or "under" the second feature may be the first feature being directly below or obliquely below the second feature, or simply means that the level of the first feature is lower than the level of the second feature.

The technical background of the present invention needs to be described for better understanding of the technical concept of the present invention.

How to innovate a natural gas hydrate exploitation technology, reduce exploitation costs, and improve an energy efficiency ratio of an exploitation process (the ratio of energy carried by produced gas to energy consumed in the exploitation process) is the key to implement large-scale safe and economical exploitation of a natural gas hydrate. Hot water injection and $CO_2$-containing flue gas injection are considered as relatively feasible means that enhance hydrate decomposition, can be combined with a depressurization method to improve the exploitation efficiency of the natural gas hydrate, and have been applied to trial exploitation of the hydrate. Currently, the key work is to carry out the following researches related to improving energy efficiency of exploitation mainly based on hot water injection and $CO_2$-containing mixed gas injection: (1) Carry out experimental simulation researches on exploitation of hydrates based on hot water injection. Optimize the amount and temperature of injected hot water to achieve a high energy efficiency ratio. Establish relationships between them and parameters of reservoir characteristics to form simulation software on the basis of experiments. (2) Develop a heat pump technology suitable for hydrate exploitation to rationally use heat energy of seawater and formation water, thereby providing a cheap heat source for heat injection exploitation. (3) Develop a technology and equipment for hot water injection and depressurization-based drainage to improve heat exploitation. (4) Carry out experimental simulation researches on exploitation of hydrates based on $CO_2$-containing mixed gas injection. Optimize the composition of injected gas and temperature/pressure conditions to increase a gas production rate and reduce separation costs of produced gas. (5) Develop a technology and technical equipment for an injection-exploitation-separation-reinjection cycle to significantly improve efficiency and energy efficiency of hydrate exploitation.

Main components of $CO_2$-containing flue gas are nitrogen and carbon dioxide. Therefore, development of carbon dioxide injection and exploitation equipment is very important for natural gas hydrate exploitation, and can also achieve good economic benefits.

Figure 2:
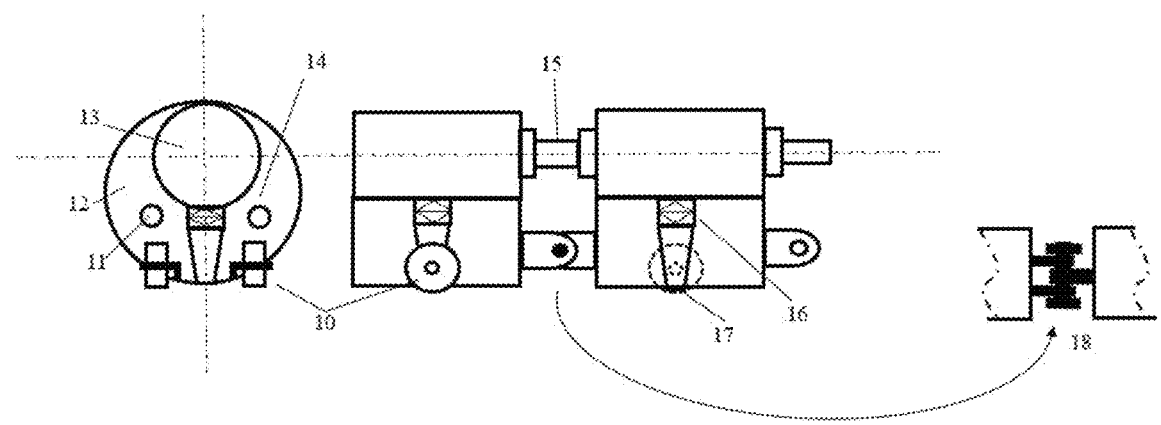
FIG. 2 is a schematic structural diagram of a gas injection horizontal well according to an embodiment of the present invention.
Figure 3:
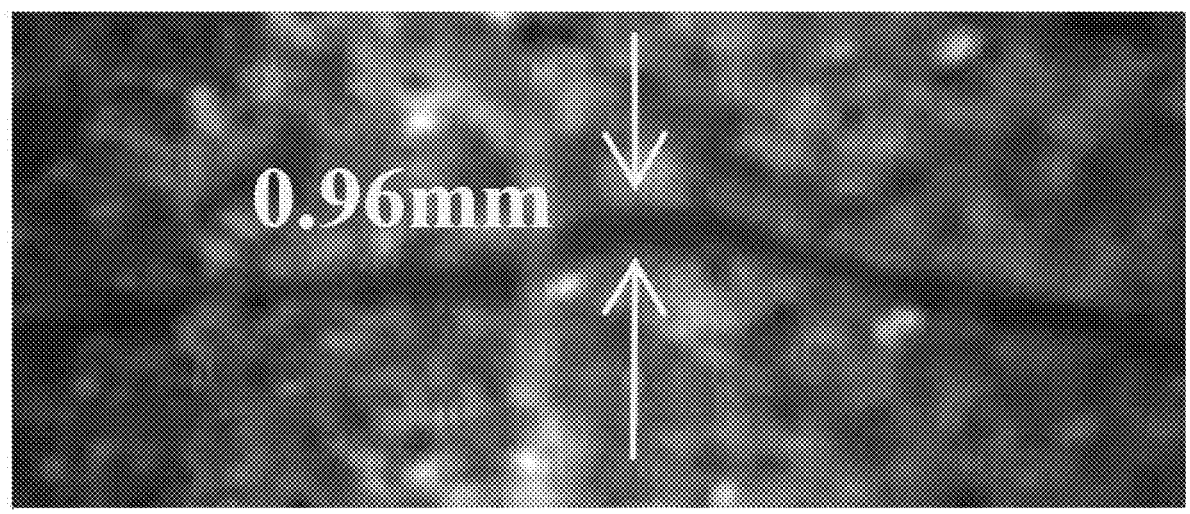
FIG. 3 is a diagram of an effect of an experiment of using mixed gas in a jet state to fracture a hydrate deposition layer according to an embodiment of the present invention.

Refer to FIG. 1 to FIG. 3. FIG. 1 is a schematic structural diagram of a nitrogen-carbon dioxide mixed gas jet apparatus for a horizontal well according to an embodiment of the present invention. FIG. 2 is a schematic structural diagram of a gas injection horizontal well according to an embodiment of the present invention. FIG. 3 is a diagram of an effect of an experiment of using mixed gas in a jet state to fracture a hydrate deposition layer according to an embodiment of the present invention. The present invention provides a nitrogen-carbon dioxide mixed gas jet apparatus for a horizontal well and an exploitation method. Mixed gas that is of nitrogen and carbon dioxide and in the jet state impacts a hydrate deposition layer, so that the hydrate deposition layer under a gas injection horizontal well is fractured to form a crack, and carbon dioxide replaces methane gas at the same time. Therefore, hydrate exploitation is realized.

It should be noted that a natural gas reservoir includes a seawater layer, an overlying layer, a hydrate layer, and an underlying layer.

A nitrogen-carbon dioxide mixed gas jet apparatus for a horizontal well is provided. The jet apparatus is used in a hydrate exploitation process and includes: an offshore platform 2, a natural gas processing unit 3, and a pressurizing unit 4. The natural gas processing unit 3 is disposed on the offshore platform 2 and goes deep into a hydrate layer of the natural gas reservoir through a gas exploitation pipe 1. The pressurizing unit 4 is disposed on the offshore platform 2 and goes deep into the hydrate layer of the natural gas reservoir through a gas injection pipe 5. A portion of the gas exploitation pipe 1 in the hydrate layer is provided with a gas injection horizontal well 8. A mixed gas jet unit 6 and a nozzle assembly 7 are disposed in the gas injection horizontal well 8. The mixed gas jet unit 6 is configured to mix nitrogen and carbon dioxide, and then inject the mixed gas into the hydrate deposition layer of the hydrate layer through the nozzle assembly 7 in a dispersed manner, so that the mixed gas of nitrogen and carbon dioxide replaces methane gas in the hydrate deposition layer. The portion of the gas exploitation pipe 1 in the hydrate layer is provided with a gas exploitation horizontal well 9. The gas exploitation horizontal well 9 is configured to collect the methane gas and convey the methane gas to the natural gas processing unit 3. According to the present invention, further, an injected medium can be replaced; heat injection and chemical agent injection are performed to exploit a natural gas hydrate; and the practicability is high.

As an optional implementation, in some embodiments, the mixed gas jet unit 6 includes several cylindrical parts connected in series. As the cylindrical parts are connected in series, a mixed gas jet unit 6 having a suitable length can be acquired via combination according to a requirement of hydrate exploitation; and a requirement of transition from vertical to horizontal can be satisfied.

As an optional implementation, in some embodiments, each of the cylindrical parts includes a high-pressure water-proof chamber 12 and a high-pressure gas injection chamber 13. The high-pressure gas injection chamber 13 is used as a gas passage of the mixed gas of nitrogen and carbon dioxide. The high-pressure water-proof chamber 12 is used to isolate the high-pressure gas injection chamber 13 from the outside world.

As an optional implementation, in some embodiments, two adjacent high-pressure water-proof chambers 12 are movably connected to each other through a hinge 18; and two adjacent high-pressure gas injection chambers 13 are connected to each other through a flexible connector 15. Further, the hinge 18 is made of a pressure-resistant and corrosion-resistant material; and the flexible connector 15 is a high-pressure-resistant and corrosion-resistant hose whose left and right ends are provided with pipe joints having internal threads, and is configured to connect the high-pressure gas injection chamber 13.

As an optional implementation, in some embodiments, each of the cylindrical parts is provided with at least one nozzle assembly 7; and the nozzle assembly 7 includes a solenoid valve 16 and a nozzle 17. The nozzle 17 is configured to inject the mixed gas of nitrogen and carbon dioxide into the hydrate deposition layer of the hydrate layer. The solenoid valve 16 is configured to control opening and closing of the nozzle 17. Gap jet of mixed gas can be realized; a gas replacing passage is prevented from being blocked; and efficiency of replacing methane with carbon dioxide is improved.

As an optional implementation, in some embodiments, each of the cylindrical parts is provided with cable interfaces and auxiliary guide wheels 10. The cable interfaces include a strong-current cable interface 11 and a weak-current cable interface 14. A strong-current cable is electrically connected to the auxiliary guide wheels 10 to control a main body apparatus to move leftwards or rightwards. A weak-current cable is electrically connected to the solenoid valve 16 to control the start and stop of the solenoid valve 16.

As an optional implementation, in some embodiments, both the gas injection horizontal well 8 and the gas exploitation horizontal well 9 are disposed horizontally; and a gas injection opening of the gas injection horizontal well 8 faces a gas exploitation opening of the gas exploitation horizontal well 9.

A method of using mixed gas of nitrogen and carbon dioxide to exploit a hydrate is provided. The method uses the apparatus described above and includes:

using the pressurizing unit 4 to pressurize the mixed gas of nitrogen and carbon dioxide to a pressure higher than a set pressure value, and sending the pressurized gas to the gas injection horizontal well 8 through the gas injection pipe 5, wherein the mixed gas jet unit 6 of the gas injection horizontal well 8 mixes nitrogen and carbon dioxide, and then sprays the mixed gas of nitrogen and carbon dioxide in a jet state through the nozzle assembly 7 in a dispersed manner;

the mixed gas that is of nitrogen and carbon dioxide and in the jet state impacts the hydrate deposition layer, so that the hydrate deposition layer under the gas injection horizontal well 8 is fractured to form a crack, and carbon dioxide replaces methane gas at the same time; and with progress of a gas injection process, methane gas around a pipe of the gas injection horizontal well 8 is also replaced, and outward extension of the crack leads to an increase of permeability around the gas injection horizontal well 8, so that a dissociation area of the hydrate deposition layer is enlarged; and the methane gas is conveyed to the natural gas processing unit 3 through the gas exploitation horizontal well 9.

As an optional implementation, in some embodiments, with the progress of the gas injection process, after the nozzle 17 through which gas is injected is closed by using the solenoid valve 16, the auxiliary guide wheels 10 are used to control the mixed gas jet unit 6 to move leftwards or rightwards, so that a position at which the mixed gas is injected is changed.

The following is a specific embodiment:

In this embodiment, the depth of water is 1200 m; the formation pressure is about 13 MPa; a horizontal section of an exploitation well is 200 in; a jet section of the exploitation well is 60 rn; there are ten mixed gas jet sub-units for nitrogen and carbon dioxide in total; the nixed gas jet sub-units are connected in series to form a mixed gas jet unit; and it is ensured that mixed gas can smoothly pass through a vertical well to a transition section of a gas injection horizontal well. The main body length of the mixed gas jet unit 6 is 30 cm. The length of the flexible connector is 30 cm. The length of the hinge is 30 cm. All components exposed in seawater are made of anti-corrosion materials.

The method in this embodiment specifically includes the following steps:

(1) Pressurize mixed gas to a pressure higher than 18 MPa in the pressurizing unit 4 for mixed gas (flue gas) of nitrogen and carbon dioxide, and pump the pressurized gas into the mixed gas jet unit 6 for nitrogen and carbon dioxide through the gas injection pipe 5.

(2) After the high-pressure mixed gas of nitrogen and carbon dioxide enters the mixed gas jet unit 6, the nozzle 7 sprays a high-pressure nitrogen and carbon dioxide jet. The high-pressure mixed gas jet impacts the hydrate deposition layer, so that the hydrate deposition layer under the gas injection horizontal well 8 is fractured to form a crack, and carbon dioxide replaces methane gas at the same time. After gas injection, the solenoid valve is closed by controlling the solenoid valve 16, so that gas injection is stopped. The auxiliary guide wheels are controlled, so that the jet apparatus is moved leftwards or rightwards, and a jet position is changed. The above operations are repeated. The experimental effect of jet fracture is shown in FIG. 3.

(3) Mixed gas of nitrogen and carbon dioxide around a pipe of the gas injection horizontal well 8 replaces methane gas. Extension of a microcrack formed due to the high-pressure mixed gas jet leads to an increase of permeability around the gas injection horizontal well 8, so that a hydrate dissociation area is enlarged. Methane gas is conveyed to the natural gas processing unit 3 through the natural gas exploitation horizontal well 9, so that hydrate exploitation is completed.

The present invention has the following beneficial effects: According to the present invention, flue gas whose main components are nitrogen and carbon dioxide may be used and is pressurized by a pressurizing system. The pressurized gas is jetted through a nozzle of the nitrogen-carbon dioxide mixed gas jet apparatus. Fracturing and efficient replacement are performed on the hydrate deposition layer. Because the gas exploitation pipe and the gas injection pipe are separated from each other, gap jet of mixed gas can be realized; a gas replacing passage is prevented from being blocked; and efficiency of replacing methane with carbon dioxide is improved. In addition, an injected medium can be replaced, heat injection and chemical agent injection are performed to exploit a natural gas hydrate; and an apparatus used in the method has a simple structure and high practicability.

In this description, a description of a reference term "an embodiment", "some embodiments", "an example", "a specific example", "some examples" or the like means that a specific feature, structure, material or characteristic described with reference to the embodiment or example is included in at least one of the embodiments or examples of the present invention. In this description, schematic descriptions of such terms are not necessarily for a same embodiment or example. Furthermore, the specific features, structures, materials, or characteristics described may be combined in an appropriate manner in any one or more embodiments or examples. Moreover, on the premise of no contradiction, those skilled in the art may integrate or combine different embodiments or examples as well as features of the different embodiments or examples described in the description.

The above embodiments are only for explaining the technical concept and features of the present invention, and the objective thereof is to enable those of ordinary skill in the art to understand the content of the present invention and implement therefrom, but not to limit the protection scope of the present invention. Any equivalent changes or modifications made according to the essence of the present invention shall fall within the protection scope of the present invention.

What is claimed is:

1. A nitrogen-carbon dioxide mixed gas jet apparatus for a horizontal well, used in a hydrate exploitation process and comprising:
    an offshore platform;
    a natural gas processing unit disposed on the offshore platform and extending deep into a hydrate layer of a natural gas reservoir through a gas exploitation pipe; and
    a pressurizing unit disposed on the offshore platform and extending deep into the hydrate layer of the natural gas reservoir through a gas injection pipe, wherein
    a portion of the gas exploitation pipe in the hydrate layer is provided with a gas injection horizontal well; a mixed gas jet unit and a nozzle assembly are disposed in the gas injection horizontal well;
    the mixed gas jet unit is configured to mix nitrogen and carbon dioxide, and then inject the mixed gas into a hydrate deposition layer of the hydrate layer through the nozzle assembly in a dispersed manner, so that the mixed gas of nitrogen and carbon dioxide replaces methane gas in the hydrate deposition layer; the portion of the gas exploitation pipe in the hydrate layer is provided with a gas exploitation horizontal well; and the gas exploitation horizontal well is configured to collect the methane gas and convey the methane gas to the natural gas processing unit; and wherein
    the mixed gas jet unit comprises several cylindrical parts connected in series;
    each of the cylindrical parts comprises a high-pressure water-proof chamber and a high-pressure gas injection chamber, wherein the high-pressure gas injection chamber is used as a gas passage of the mixed gas of nitrogen and carbon dioxide; the high-pressure water-proof chamber is used to isolate the high-pressure gas injection chamber from the outside world; and
    two adjacent high-pressure water-proof chambers movably connected to each other through a hinge; and two adjacent high-pressure gas injection chambers are connected to each other through a flexible connector.

2. The nitrogen-carbon dioxide mixed gas jet apparatus for a horizontal well according to claim 1, wherein each of the cylindrical parts is provided with at least one nozzle assembly; the nozzle assembly comprises a solenoid valve and a nozzle, wherein the nozzle is configured to inject the mixed gas of nitrogen and carbon dioxide into the hydrate deposition layer of the hydrate layer; and the solenoid valve is configured to control opening and closing of the nozzle.

3. The nitrogen-carbon dioxide mixed gas jet apparatus for a horizontal well according to claim 2, wherein each of the cylindrical parts is provided with cable interfaces and auxiliary guide wheels, wherein the cable interfaces comprise a strong-current cable interface and a weak-current cable interface; a strong-current cable is electrically connected to the auxiliary guide wheels to control a main body apparatus to move leftwards or rightwards; and a weak-current cable is electrically connected to the solenoid valve to control the start and stop of the solenoid valve.

4. The nitrogen-carbon dioxide mixed gas jet apparatus for a horizontal well according to claim 1, wherein both the gas injection horizontal well and the gas exploitation horizontal well are disposed horizontally; and a gas injection opening of the gas injection horizontal well faces a gas exploitation opening of the gas exploitation horizontal well.

5. The nitrogen-carbon dioxide mixed gas jet apparatus for a horizontal well according to claim 1, wherein the hinge is made of a pressure-resistant and corrosion-resistant material; and the flexible connector is a high-pressure-resistant and corrosion-resistant hose whose left and right ends are provided with pipe joints having internal threads, and is configured to connect the high-pressure gas injection chamber.

6. A method of using mixed gas of nitrogen and carbon dioxide to exploit a hydrate, using the apparatus according to claim 1 and comprising:
    using the pressurizing unit to pressurize the mixed gas of nitrogen and carbon dioxide to a pressure higher than a set pressure value, and sending the pressurized gas to the gas injection horizontal well through the gas injection pipe, wherein the mixed gas jet unit of the gas injection horizontal well mixes nitrogen and carbon dioxide, and then sprays the mixed gas of nitrogen and carbon dioxide in a jet state through the nozzle assembly in a dispersed manner;
    the mixed gas of nitrogen and carbon dioxide and in the jet state impacts the hydrate deposition layer, so that the hydrate deposition layer under the gas injection horizontal well is fractured to form a crack, and carbon dioxide replaces methane gas at the same time; and
    with progress of a gas injection process, methane gas around a pipe of the gas injection horizontal well is also replaced, and outward extension of the crack leads to an increase of permeability around the gas injection horizontal well, so that a dissociation area of the hydrate deposition layer is enlarged; and the methane gas is conveyed to the natural gas processing unit through the gas exploitation horizontal well.

* * * * *